(12) United States Patent
Ruiz Larrea De Tuero

(10) Patent No.: US 7,719,133 B2
(45) Date of Patent: May 18, 2010

(54) DIGITAL WIRING SYSTEM FOR VEHICLES

(75) Inventor: Fernando Ruiz Larrea De Tuero, San Vicente (ES)

(73) Assignee: Sistemas Integrados Para la Automocion, S.L., Valencia (ES)

( * ) Notice: Subject to any disclaimer, the term of this patent is extended or adjusted under 35 U.S.C. 154(b) by 745 days.

(21) Appl. No.: 11/313,301

(22) Filed: Dec. 20, 2005

(65) Prior Publication Data
US 2006/0251128 A1   Nov. 9, 2006

Related U.S. Application Data

(63) Continuation of application No. PCT/ES2004/000290, filed on Jun. 21, 2004.

(30) Foreign Application Priority Data

Jun. 20, 2003   (ES)   ............................... 200301452

(51) Int. Cl.
*B60L 1/00* (2006.01)
(52) U.S. Cl. .................. 307/10.1; 307/10.6; 370/498; 370/499; 370/503; 701/1
(58) Field of Classification Search .................. 701/1; 307/10.1, 10.6; 370/498, 499, 503
See application file for complete search history.

(56) References Cited

U.S. PATENT DOCUMENTS

| | | | | |
|---|---|---|---|---|
| 4,907,222 A | * | 3/1990 | Slavik | 370/443 |
| 5,613,398 A | * | 3/1997 | Lawson | 73/304 C |
| 6,650,266 B1 | * | 11/2003 | Tester | 341/144 |
| 6,744,147 B2 | * | 6/2004 | Taniguchi et al. | 307/10.1 |
| 2001/0015918 A1 | * | 8/2001 | Bhatnagar | 365/200 |
| 2002/0035715 A1 | * | 3/2002 | Hatakeyama | 714/788 |
| 2003/0010015 A1 | * | 1/2003 | Beck et al. | 60/204 |
| 2003/0074489 A1 | * | 4/2003 | Steger et al. | 710/1 |

FOREIGN PATENT DOCUMENTS

EP   1 264 738 A3   6/2004
WO   WO 97/36400   10/1997

* cited by examiner

*Primary Examiner*—Tuan C To
*Assistant Examiner*—Redhwan Mawari
(74) *Attorney, Agent, or Firm*—Klauber & Jackson, LLC

(57) ABSTRACT

The invention relates to a simplified digital wiring system for vehicles. The invention comprises a synchronisation generator (2) which is connected to a plurality of multiplexer modules (1a, 1b, 1b') via a synchronisation (6) and, at other times, data line. In turn, the aforementioned multiplexer modules (1a, 1b, 1b') are connected to a plurality of inputs and/or outputs for receiving/transmitting data from/to electroelectronic devices, such that the synchronisation generator selects a multiplexer module so that said module manages the inputs and/or outputs thereof and, in this way, can control the operations of the different electroelectronic devices (13-19). Moreover, the multiplexer modules can be connected to the synchronisation generator (2) in parallel (1a) or in series (1b, 1b'). The invention is advantageous in that the multiplexer modules (1a, 1b, 1b') are connected using a single synchronisation (6) and data (7) line, thereby simplifying the wiring.

22 Claims, 4 Drawing Sheets

DIGITAL WIRING SYSTEM FOR VEHICLES

RELATED APPLICATIONS

Figure 1:
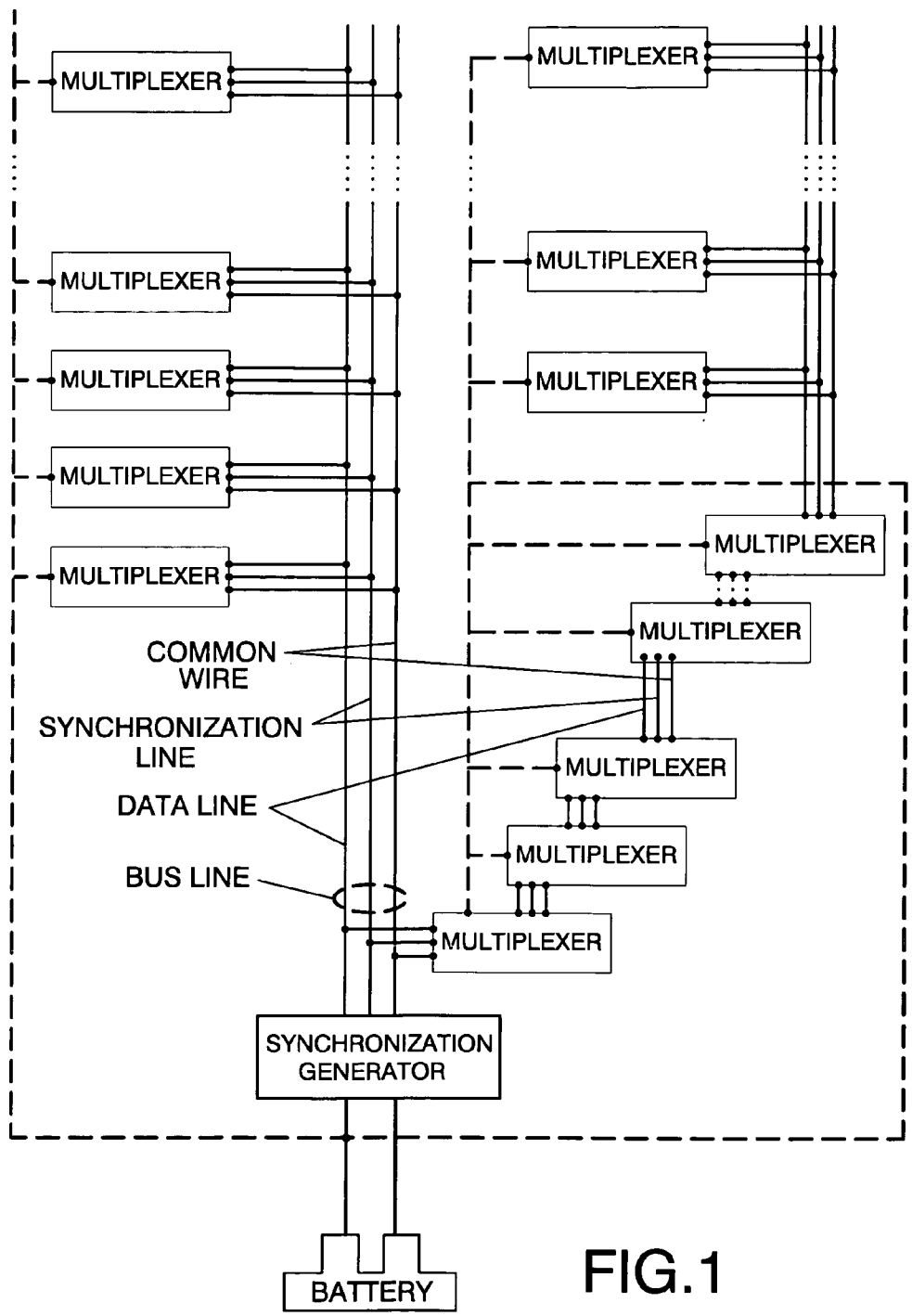

The present application is a Continuation of co-pending PCT Application No. PCT/ES2004/000290, filed Jun. 21, 2004 which in turn, claims priority from Spanish Application Serial No. 200301452, filed on Jun. 20, 2003. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

As stated in the title of this specification, this invention relates to a digital wiring system for vehicles with the aim of simplifying that wiring, such that the number of wires used and the assembly time required is reduced.

The invention is applicable in any automotive vehicle, such as cars, trucks, trains, aircraft, etc.

PRIOR ART OF THE INVENTION

In the automobile market, the demands in equipping for comfort, information, supervision, safety, control, etc. have generated an increase in integrated systems in turn compelling an expansion in the electrical wiring supplying the energy and control to the different pieces of equipment.

Each different piece of equipment generates a variety of ranges within a single model forcing the manufacture to provide different types of wiring, or to keep the same wiring for all the models of the range and not to use part of it since some models in the range do not include all the utilities.

As a result, the wiring of vehicles is becoming ever more complicated and leading to an increase in manufacturing costs.

The following references are representative of the state of the art. Accordingly, EP-1264738 relates to a cable collector system made up of node connectors which include multiplex communication controllers. The multiplex communication controllers of the node connectors have a sample reception controller for receiving the sample via a set of timing bits which is set during each defined period of time. Only one specific node connector has a controller that includes a CPU and the multiplex communication controllers allow the node communication controllers to make common use of data that is stored in the controller. Also, WO-9736400 relates to a device for transferring data during certain time spaces within a framework of time multiplexed networks, which comprises a master node and a slave node, wherein the allocation of time spaces so that the slave node can receive data from or transmit data to a third node is controlled by said master node. Neither of the foregoing references is believed to disclose or suggest the present invention.

DESCRIPTION OF THE INVENTION

In order to simplify the wiring of vehicles and cut costs, the invention has developed a new wiring system characterized in that it comprises a synchronisation generator which generates a clock signal consisting of pulse trains separated by rest periods which, by means of a synchronisation line, it sends to at least one multiplexer module, which is in turn selectively connected to at least one reception input for data coming from electroelectronic devices of the vehicle and/or to a transmission output for data to the electroelectronic devices to govern; the multiplexer module also having means of storing an identification code, means of detection of the pulses generated in order to generate codes on the basis of these pulses, and a detection decoder which, when the generated code corresponds to that of the multiplexer module, its activation takes place and permits transmission/reception of data for governing the electroelectronic devices.

In an embodiment of the invention, a plurality of multiplexers has been provided, which receive the pulse trains and which are connected together and to the synchronisation generator via a data line, in order to permit exchange of input and/or output data among the different multiplexers and thereby govern the electroelectronic devices connected to different multiplexer modules.

This configuration allows the multiplexer modules to transmit various sets of information or data down the data line sequentially without losing any identity, awarding an occupancy time of the line for each datum belonging to each multiplexer module on the basis of the detected identification code.

The detection means of the generated pulse consist of a counter for those generated pulses in order to generate the different codes. The means of storage of at least one identification code comprise a microswitch for selection of that code; and the decoder comprises a comparator which receives the count from the pulses and the code set up via the microswitch, in such a way that when it detects that the count made corresponds to the identification code it activates the multiplexer module.

The management time of an input and/or output of a multiplexer module corresponds to a cycle or period of the pulse train. As a result, the counters are provided with means for maintaining the activation of the module during a certain number of cycles corresponding to the number of inputs and/or outputs of the multiplexer module.

In an embodiment of the invention, the multiplexer module is planned to manage an input or output during one cycle of the pulse train.

In another embodiment of the invention it has been planned for the multiplexer module to manage an input or output with each half cycle of the pulse train in order to process two input/output data with each cycle.

In order for the system to function correctly, the multiplexer modules are provided with means for detecting the rest periods, the detection of which generates the setting of the counter to zero, with each multiplexer module being able to be selected in different periods of time.

In an embodiment of the invention, the means for detecting the rest periods comprise a monostable which is kept in the stable state during the pulse trains and switches when no pulse train is detected.

The invention provides that the feed for the multiplexers can be done directly starting from the pulse trains, in such a way that the synchronisation line also constitutes that for the feed. Also, the multiplexers are fitted with the corresponding direct current feed input coming directly from the battery so that they can be fed by the battery when necessary.

The embodiment of using the synchronisation line as a feed line is advantageous since it saves on a wire and a connection for each multiplexer module as well as making it independent of the power supply coming from the vehicle battery, and it furthermore permits the system to be made compatible with the new tendencies in automobiles which point to the fact that in future the electrical equipment of vehicles is going to be fed with more than 40 volts, something that can easily be achieved by means of pulse trains.

Depending on the control structure of the different electroelectronic devices, the possibility exists that at least two multiplexer modules might need to be activated simultaneously, in which case those multiplexer modules are planned to have the same identification code and therefore act at the same time and independently of the place where they are located, when the processed order concerns that address. In this case, they generate the same code in the data line when their inputs are acted upon.

Apart from being carried out by means of the electric wires that are conventionally used for these applications, the wiring is suitable for being carried out by means of optical fibre, in which case optoelectronic devices have to be used in order to permit the correct transmission/reception of data and synchronisation.

The use of optical fibre has been especially conceived for the series connection of multiplexer modules.

The multiplexers can be connected in parallel or series.

In said series connection, just the first multiplexer modules comprises the means of setting up the identification code and the decoder, while the rest of the modules only comprise the means for detecting the pulse generated. In this case the first multiplexer module, after its decoder has managed the inputs and outputs that it expects by means of the synchronisation pulses in the way already described, inhibits its clock input in the last cycle and activates the following multiplexer module, in a kind of knock-on effect, for which it allows the synchronisation signal to pass, and so on successively as far as the last multiplexer module. In this case, the data connection of the series multiplexer modules is common to them all, in such a way that series connection is perfectly compatible with parallel connection.

Series connection has the advantage that the multiplexer modules present a simpler configuration than in the case of parallel connection, since just the first multiplexer module needs to carry out the decoding, so this element has been removed from the rest of the multiplexer modules connected in series with the first.

On the basis of the description made, it can be understood that the counters have the means so that in certain addresses they manage the data inputs, in other words they read that data, and in others they manage the outputs, in other words they write data.

It can also be understood that the multiplexer modules can receive analog and/or digital data in their inputs and/or outputs.

According to the description made, all the data of the system provided by the multiplexer modules circulate along the data line, in which there is always data present, even if no manoeuvre is being performed, since each multiplexer module writes its presence code in the system when it detects its identification code and is not performing any manoeuvre. This property is exploited for controlling the good state of the data line in such a way that if data does not appear due to a short-circuit in the wire or any open line, the system gives warning of the event.

The structure described presents the following advantages:

It permits the designs for the electric wires to be homogenised for different models with a minimum use of wires.

It saves on more than 75% of the wiring needed for classical bundles.

It avoids a large number of drillings in the vehicle body needed so that those bundles can pass.

It significantly reduces the assembly and connection times in the production line for vehicles.

It facilitates the connection, checking, handling and checking without any specialised additional labour costs.

It facilitates an understanding of the system and provides simplicity of maintenance.

It creates less weight than present systems.

It permits an increase in controls and checks on the various electrical elements of a vehicle by the user, including detection of faults in them.

Also, in after-sales, it facilitates rapid checking of the electrical systems and the replacement of components.

Regarding the vehicle manufacturer, it does not generate any greater technological dependence on third parties than that created by conventional systems.

It permits installation in low range cars since it is less costly.

No special wiring is needed for its installation.

It permits compatibility with other data systems, or controlled peripherals.

it is totally compatible with present-day command and control elements, such as relays, switches, activators, sensors, etc. (electroelectronic elements), and it also open up different possibilities for permitting the incorporation of new command elements with less breaking power, since they all attack very low consumption electronic circuits which means that the system of the invention permits the modern and ergonomic design of those components.

Below, in order to facilitate a better understanding of this specification and forming an integral part thereof, a series of figures is attached in which, by way of illustration and not to be regarded as limiting, the object of the invention has been represented.

BRIEF DISCUSSION OF THE FIGURES

FIG. 1.—Shows a schematic view of a possible example of embodiment of the invention in which the series and parallel connection is shown of the multiplexer modules to the synchronisation generator.

Figure 2:
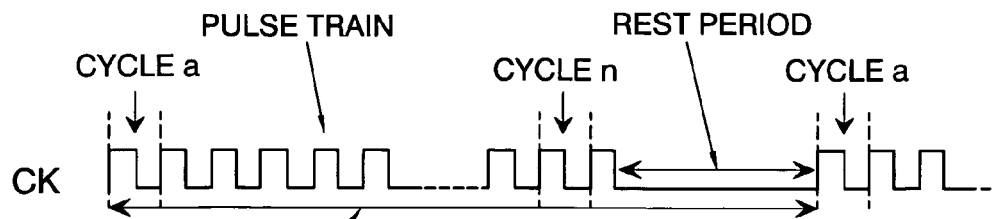

FIG. 2.—Shows a time diagram of the signal provided by the synchronisation generator which consists of pulse trains of a defined frequency, separated by rest periods, in this example of embodiment the rest period being in logic status "0".

Figure 3:
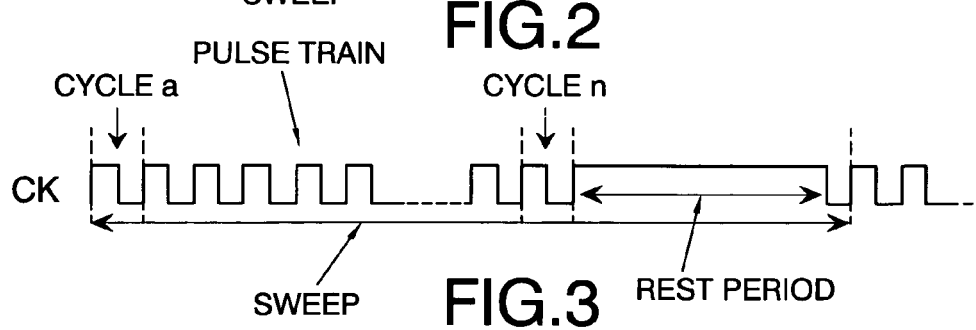

FIG. 3.—Shows the time diagram of the previous figure but in this case the rest periods appear in logic status "1".

Figure 4:
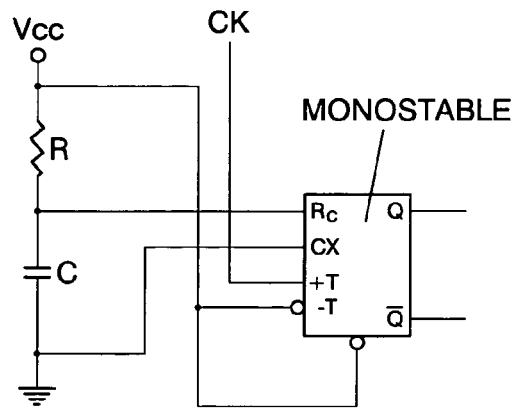

FIG. 4.—Shows an example of the configuration of the monostable circuit by means of which the setting to zero is performed for the counters included in the multiplexer modules each time a rest period is detected in the synchronisation signal shown in FIGS. 2 and 3.

Figure 5:
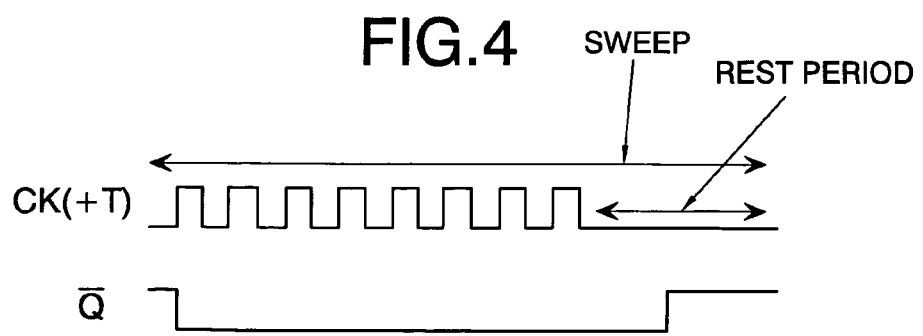

FIG. 5.—Shows a time diagram of the synchronisation signal and the signal produced at the output of the monostable of the previous figure.

Figure 6:
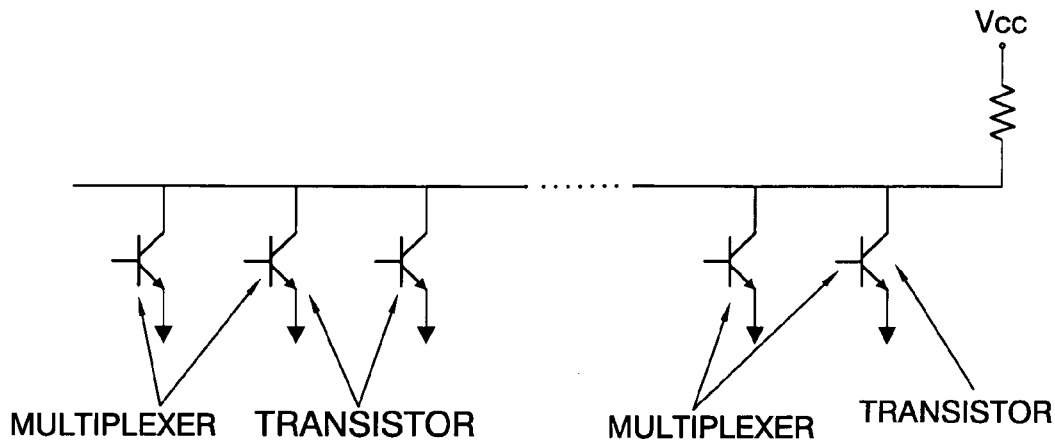

FIG. 6.—Shows a possible example of embodiment of the connection of the multiplexer modules to the data line in order to write data, for which the outputs from the multiplexer modules are connected to the base of a transistor.

Figure 7:
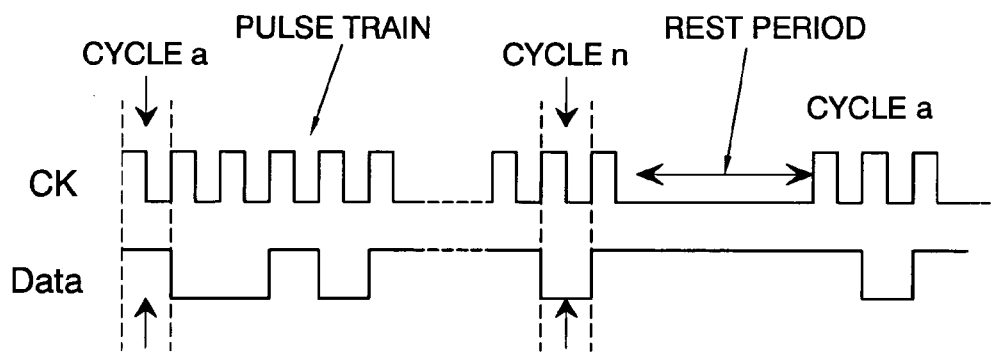

FIG. 7.—Shows a time diagram of a possible relation between the data line and the synchronisation line, in which each pulse or period of the pulse train constitutes the time for processing the input data of the selected multiplexer module.

Figure 8:
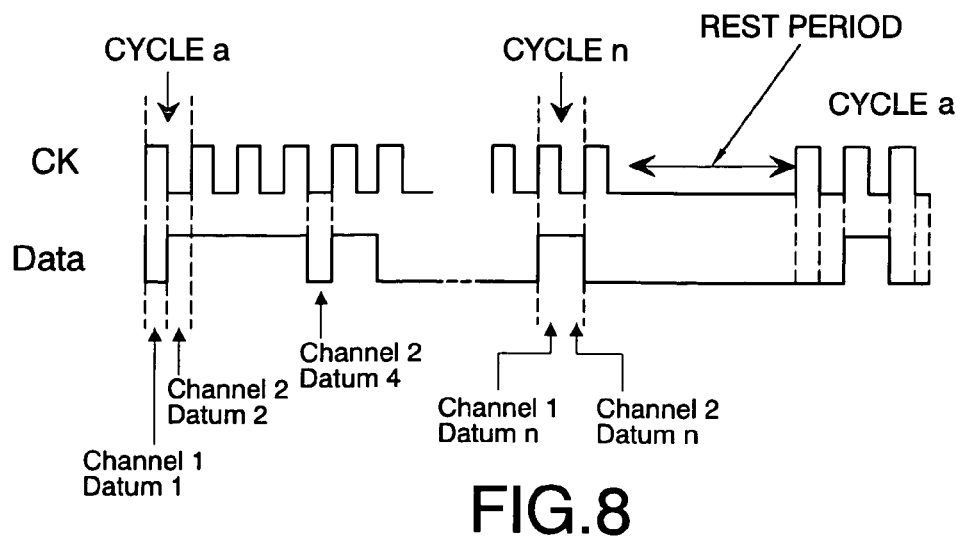

FIG. 8.—Shows the time diagram of another possible embodiment between the data line and the synchronisation line. In this case, each half cycle of the pulse train manages an input or output datum of the selected multiplexer module.

Figure 9:
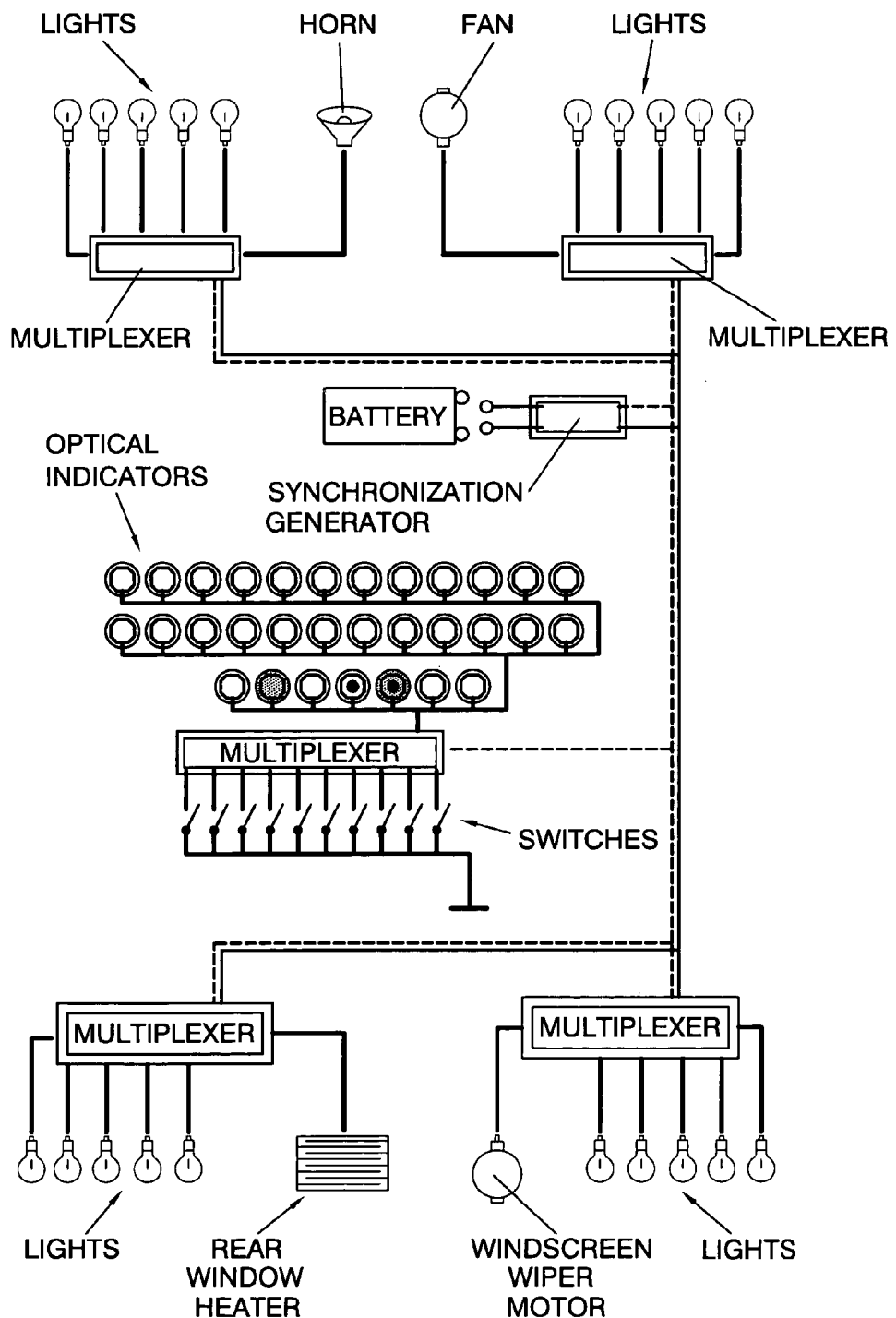

FIG. 9.—Shows a schematic view of a possible example of embodiment of the system of the invention applied to a car.

DESCRIPTION OF A PREFERRED FORM OF EMBODIMENT

Given below is a description of the invention based on the figures commented on above.

The system of the invention consists of a synchronisation generator 2 which is connected to a plurality of multiplexer modules 1a, 1b and 1b'.

The multiplexer modules can be connected in series or parallel. In the first case it is referenced with 1a, and in the second with 1b, 1b'.

The synchronisation generator 2 generates a clock signal consisting of pulse trains separated by rest periods 4 in such a way that both times 3 and 4 constitute a sweep 5 which is repeated sequentially and is sent to the different multiplexer modules 1a, 1b and 1b' via the synchronisation line 6.

The synchronisation generator 2 is also connected to different multiplexer modules 1a, 1b and 1b' via a data line 7 for the transmission and reception of data.

The line 8 represents the common wire essential in electrical connections.

The system of the invention refers to the lines 6, 7 and 8 as bus line, such that said bus line constitutes the sole means of connection of the synchronisation generator to the different multiplexer modules.

Moreover, the different multiplexer modules are connected to electroelectronic devices consisting of control circuits and electronic elements, such as might be lamps, sensors, switches, etc., in such a way that they define inputs and/or outputs for the multiplexer modules.

Therefore, the multiplexer modules incorporate as many inputs and/or outputs as elements that have to be governed. Represented in FIG. 9 are different electroelectronic devices 13-18 to govern by means of the different multiplexers, for which each of them incorporates a different number of inputs and/or outputs, as shall be described later on.

The synchronisation generator 2 provides sufficient power for exploiting the synchronisation signal in order to provide the feed to the different multiplexer modules of the system, though these modules 1a, 1b, 1b' are provided with an input for receiving an alternative supply of direct current coming directly from the battery 9 of the vehicle, which has been represented by means of the broken line 10.

The advantage of using the synchronisation line for providing feed to the different multiplexer modules is that it saves on a wire and a connection for each module, as well as making them independent of the power supply coming from the battery 9, with which the system is compatible with the new tendencies in automobiles in which electrical equipment is going to be fed with more than 40 volts in the future.

FIG. 2 shows a clock signal in which the rest periods 4 are presented by means of the logic status "0" while in FIG. 3 these rest periods 4 are defined by a "1" depending on the logic used by the multiplexer modules.

The multiplexer modules are provided with a counter which detects the arrival of the different clock cycles of the pulse train 3 so that with the arrival of the first cycle 3a the counters of the multiplexer module count one pulse and so on successively in such a way that each counter generates a code corresponding to the cycle number 3a, 3b, 3n, of the pulse train 3.

In addition, the modules 1a and 1b are provided with a microswitch via which an identifying code is set up for each of the multiplexer modules 1a and 1b, which are connected to a comparator, which also receives the count made by the counter, such that when the code generated by the counter coincides with that set up by means of the microswitches the multiplexer module is activated for managing the inputs and outputs that it is expecting. Also, when they receive the rest period 4, the multiplexer modules 1a and 1b detect it in order to set the counters to zero and start the count again with the following pulse train.

In order to carry out the setting to zero, provision has been made for the incorporation of a monostable circuit 11 in the multiplexer modules 1a and 1b, in which the clock signal CK directly attacks the circuit whose time constant is regulated by an RC combination (resistor and capacitor). This time constant is always greater than the duration of a clock cycle and less than the duration of the time for setting to zero. So, the monostable is being continuously retriggered by the falling edges of the clock maintaining its output Q in its upper part constantly at zero, as shown in FIG. 5. When the CK signal remains at rest, the monostable stops being triggered and, once the time set by the RC constant has passed, it changes the value of the output thereby generating the synchronisation signal for setting to zero of the multiplexer modules.

The number of cycles per sweep and the frequency of them can be regulated in the synchronisation generator 2 according to needs. This number is important since it indicates the amount of data that can be processed by the system. It can also be highlighted that this parameter affects the response speed of the system since if, for example, the clock has a work frequency of 2 khz and each sweep generates 100 pulses, the time taken in "reading" a certain datum is a maximum of "0.5" while if 500 pulses are generated it takes "0.25".

If, for example a hundred pieces of data have to be managed working at a frequency of 1 khz, this means that the hundred pieces of data are read or written a hundred times in each second, so for practical purposes it can be considered that, for the functions performed by the multiplexer modules, they are working in real time.

In order to further accelerate the reading and writing speed of data in the data line 7, the clock frequency can be increased, though one has to reach a compromise value since at higher frequencies, the system becomes more sensitive to the interferences produced by breaking currents and it also needs special wiring.

As far as the data line 7 is concerned, it can be mentioned that each multiplexer modules writes the data in the line via a transistor 12 (FIG. 6), which in the example of embodiment, is an open collector line transistor, being NPN or PNP, depending on the logics that are applied in the rest status of the line 7, therefore the line 7 will have to be positive or negative polarised.

Once a multiplexer module has detected its identification code and wishes to write a datum in the data line 7, it excites the transistor 12 to saturation, placing it in short-circuit and forcing the line to set its polarisation voltage to zero if it is NPN or the reverse if it is PNP. In the example of FIG. 6 NPN type transistors 12 have been represented.

Also, each of the multiplexer modules has a logic input device connected (not shown in the figures) by means of which the information circulating through the data line 7 is read, capturing the data present in them when the multiplexer module has been selected.

Each multiplexer module has a time for transmitting and reading the information corresponding to each of its inputs and outputs, and which is determined by the address corresponding to the identification code of each multiplexer module, whose counters include a suitable combination of logic gates which allow the module to be available during a certain number of cycles for reading or writing data corresponding to the inputs and outputs included in each multiplexer module.

The invention provides that in one embodiment, as shown in FIG. 7, the multiplexer has a clock cycle for writing or reading a datum; and moreover in another embodiment it provides that a datum can be read or written with each half clock cycle, as shown in FIG. 8.

With regard to FIG. 7, the first pulse 3a corresponds to the address 1, and, as can be seen in this sweep, there is no active data (inverse logic), in such a way that the time for transmitting its information in the address 1 lies between the rising edge of the first clock cycle and the rising edge of the second clock cycle. In the cycles 2, 3, 5 and 3n it can be seen how data is being transmitted but not in the rest. Once all the data of the sweep has been transmitted the setting to zero can be seen after which a new sweep starts in which the data might have varied its status, as happens in cycle number 3 which has gone from "0" to "1", so to each address there corresponds a clock cycle during which the selected module has to write or read the datum present in the data line 7.

As far as FIG. 8 is concerned, it can be stated that, as in the above case, the first clock pulse 3a corresponds to address 1, and as can be seen before the first clock cycle, which is known as channel 1, there is an active datum (inverse logic), while in the following semi-period, which is known as channel 2, there is no active datum. Therefore the time for transmitting the information in the address 1 in channel 1 is shared between the rising edge of the first rising cycle of clock 3a and the falling edge of the same clock cycle pulse. In cycles 2, 3, 5 and n it can be seen how transmission is taking place in both channel 1 and channel 2.

Nevertheless, in cycle 4 the channel 1 has an inactive datum, and channel 2 an active datum. Once all the data of the sweep have been transmitted, the setting to zero is detected, already mentioned above, starting from which a new sweep begins in which the data can have varied its status, as is observed in cycle 1, channel 2 which passes from inactive to active and cycle 3 which has passed from inactive to active in channel 1 and channel 2.

Therefore, in this case, as in the previous one, the dedicated time in the data line to each address is equal to one clock cycle, but with the difference that two pieces of data are being managed for each clock cycle, for which there has to be a suitable combination of logic gates permitting the two pieces of data to be decoded unequivocally without the counters changing their logic address.

In this case, if, instead of handling two pieces of status data, what it is wished to process is a value of a certain analog element, for example the value of a temperature, the analog digital converter is connected to the logic inputs of a multiplexer module. Assuming that the converter has a resolution of 8 bits, this will consume eight pieces of data of the system just by addressing four clock counting positions, with which there will be a processing capacity of 256 different values in just 4 clock bits.

The system is therefore synchronous.

Modules 1a are connected in parallel with the lines 6, 7 and 8 while modules 1b and 1b' are connected in series, the functioning of the modules connected in series 1b and 1b' being different from that of modules 1a, as described below.

Module 1b functions in the way already described, consuming the necessary clock cycles corresponding to it for managing each input and output, but with the difference that with the last cycle it activates a signal which detains the clock count of its counter, using this signal in a kind of knock-on effect for enabling the following multiplexer module 1b', and also it allows the synchronisation signal to pass, this same process being successively repeated with the following module 1b' connected in series.

As a consequence, the modules 1b' do not incorporate a decoder nor an identification code since their code corresponds to that of the first module 1b which is the one that detects the identification code and carries out the activation of the following modules connected in series 1b' as has been described.

Accordingly, in the event that the modules 1b and 1b' are of eight pieces of data each, between inputs and outputs, their construction and configuration would be as if they were a single module for a system which can only process eight addresses detected by the first module 1b, in such a way that, once the first eight clock cycles have passed, it exploits the falling edge of the last pulse in order to inhibit its clock input leaving it at rest, provoking after the setting to zero time the addressing to the zero position in its counter, with which the functioning philosophy corresponds to that already described.

The signal used for inhibiting the clock input is also used for facilitating that of the following module 1b', being successively repeated for the following modules 1b' as already described.

It is important to state that in the series connection the data line 7 presents continuous steps between the different modules 1b-1b', therefore the system is a hundred percent compatible with parallel connections.

Represented in FIG. 1 are modules 1a connected in parallel with the output of the last module 1b', and their functioning is identical to that already described for the parallel modules, since the passage is allowed of the synchronisation signal between the different modules 1b' and the data line is common for them all.

The bus can consist of electrical wires, but the possibility also exists that it can consist of fibre optic cables, which are especially recommended for the case in which the modules are connected in series.

In the event of using optical fibre, it is connected to the input of an optoelectronic transducer which electronically activates the same point when the cable is used, due to which starting from that point the system behaves the same as with electrical wire.

Afterwards the signal is summed to that processed by the actual multiplexer module in order to write in the data line using the same output transistor as represented in FIG. 6, with the difference that in this case, instead of attacking the polarised data line, it excites the LED of an optocoupler for optical fibre.

This fibre enters into the following multiplexer module exciting an optoelectronic transducer, injecting it with the data that has been summed from the previous modules or coming from the bus in the case of a mixed system, and so on successively.

By way of example, FIG. 9 shows different devices that can be governed by the multiplexer modules, for which four multiplexers of six outputs and one multiplexer of thirty-one outputs and ten inputs have been provided. So, for example, those that govern six outputs are dedicated to activation of the outside lights 13, horn 15, fan 16, rear window heater 17 and windscreen wiper motor 18. For the multiplexer module with ten inputs and thirty-one outputs, it is provided in the control panel for detecting the status of the various switches 19 and activating the corresponding optical indicators 14.

Represented in FIG. 9 is the battery 9 without being connected to the multiplexer modules, though as in the example of FIG. 1 it could be connected to them.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. A digital wiring system for vehicles comprising: a synchronization line (6); a data line (7) for data transmission and reception; a plurality of multiplexer modules connected in series via the synchronization line (6) and the data line (7), said plurality of multiplexer modules at least comprising a first multiplexer module (1b); and, a second multiplexer module (1b');

a synchronization generator (2), which generates a clock signal consisting of pulse trains (3) separated by rest periods (4) that represent a at least one multiplexer module identification code, said clock signal is sent to the plurality of multiplexer modules via the synchronization line; being said synchronization generator (2) regulated in frequency and cycles per sweep;

at least one multiplexer module of the plurality of multiplexer modules is connected with at least one electro-electronic device selected from the group consisting of a data transmission electro-electronic device, a data reception electro-electronic device, and a data transmission and reception electro-electronic device; and, the first multiplexer module (1b) at least comprising:

a means for storing at least one multiplexer module identification code;

a means for detecting the pulses of the signal received in the multiplexer module via the synchronization line;

a means for generating at least one multiplexer module identification code from the detected pulses, said multiplexer module code identification means comprises a counter which performs a count of each clock pulse (3) of the synchronization signal;

a detection decoder that carries out the following actions in the multiplexer module when the generated multiplexer module identification code, obtained from the performed count, and the stored multiplexer module identification code match: activating the multiplexer module during one pulse duration; reading/writing at least one data from/into the data line (7) during said pulse duration; and, reading/writing a data from/into the outputs/inputs of the at least electro-electronic device connected to the multiplexer module during said pulse duration; being said at least electro-electronic device activated with the data located into the inputs of the at least electro-electronic device connected to the multiplexer module.

2. The system of claim 1, wherein in said series connection solely the first multiplexer module (1b) of that series connection comprises the means for storing the multiplexer module identification code and wherein the decoder, after managing the inputs/outputs, comprises means of inhibiting a last cycle of the clock signal input of the decoder; and means for activating the second multiplexer module (1b') allowing the synchronization signal to pass to said second multiplexer module.

3. The system of claim 1, wherein said plurality of multiplexer modules comprise at least three multiplexer modules (1a, 1b, 1b') connected to each other by one option selected from the group consisting of a parallel connection, a series connection and a series and parallel connection, via the synchronization line (2) and the data line (7) common for the transmission/reception of input/output data of the multiplexer modules (1a, 1b, 1b').

4. The system of claim 2, wherein said plurality of multiplexer modules comprise at least three multiplexer modules (1a, 1b, 1b') connected to each other by one option selected from the group consisting of a parallel connection, a series connection and a series and parallel connection, via the synchronization line (2) and the data line (7) common for the transmission/reception of input/output data of the multiplexer modules (1a, 1b, 1b').

5. The system of claim 1, wherein the means for storing the at least one multiplexer module identification code comprising a code selection microswitch; the decoder comprising a comparator which is connected to the pulses detection means and storage means, for activating the multiplexer module when the performed count and the stored multiplexer module identification code match.

6. The system of claim 1, wherein the management time of an input/output corresponds to one clock cycle.

7. The system of claim 1, wherein the management time of an input or output corresponds to a half clock cycle, in order to process two pieces of data with each clock cycle, the counter being kept in the same status.

8. The system of claim 1, wherein the counter is provided with a means for maintaining the activation of the multiplexer module (1a, 1b, 1b') during a defined number of clock cycles corresponding to the number of inputs/outputs of the multiplexer module.

9. The system of claim 1, wherein the multiplexer modules (1a, 1b) comprise a means for detecting the rest periods (4) and for setting the counter to zero when said detection is carried out.

10. The system of claim 9, wherein the means for setting the counter to zero comprises a monostable (11).

11. The system of claim 1, wherein the clock signal provides the supply voltage for the multiplexer modules (1a, 1b, 1b').

12. The system of claim 1, wherein at least two multiplexers (1a) have the same identification code for being activated simultaneously.

13. The system of claim 1, wherein the series connection is effected by means of optical fiber cables.

14. The system of claim 3, wherein the series connection is effected by means of optical fiber cables.

15. The system of claim 4, wherein the series connection is effected by means of optical fiber cables.

16. The system of claim 3, wherein in said series connection solely the first multiplexer module (1b) of that series connection comprises the means for storing the multiplexer module identification code, the decoder, after managing the inputs/outputs, comprises a means for inhibiting a last cycle of the clock signal input of the decoder, and a means for activating the second multiplexer module (1b') allowing the synchronization signal to pass to said second multiplexer module, and so on successively from the preceding multiplexer module to the following multiplexer module, as far as the final multiplexer module of said series connection.

17. The system of claim 4, wherein in said series connection solely the first multiplexer module (1b) of that series connection comprises the means for storing the multiplexer module identification code, the decoder, after managing the inputs/outputs, comprises a means for inhibiting a last cycle of the clock signal input of the decoder, and a means for activating the second multiplexer module (1b') allowing the synchronization signal to pass to said second multiplexer module, and so on successively from the preceding multiplexer module to the following multiplexer module, as far as the final multiplexer module of said series connection.

18. The system of claim 1, wherein the multiplexer module counter comprises a means for permitting multiplexer module reading in certain addresses and a means for permitting multiplexer module writing in certain addresses that are different from the reading addresses.

19. The system of claim 1, wherein the multiplexer modules (1a, 1b, 1b') receive in their inputs/outputs data one type of data selected from the group consisting of analog data and digital data.

20. The system of claim 3, wherein the multiplexer modules (1a, 1b, 1b') receive in their inputs/outputs data one type of data selected from the group consisting of analog data and digital data.

21. The system of claim 4, wherein the multiplexer modules (1a, 1b, 1b') receive in their inputs/outputs data one type of data selected from the group consisting of analog data and digital data.

22. The system of claim 1, wherein the multiplexer modules (1a, 1b) write multiplexer module identification code into the data line (7) and do not execute any input/output, when selected, in order to check the Status of the data line (7).

* * * * *